United States Patent [19]
Ikegaya et al.

[11] Patent Number: 5,636,153
[45] Date of Patent: Jun. 3, 1997

[54] DIGITAL SIGNAL PROCESSING CIRCUIT

[75] Inventors: Yuji Ikegaya; Shinichi Muramatsu; Toru Shirayanagi, all of Hamamatsu, Japan

[73] Assignee: Yamaha Corporation, Japan

[21] Appl. No.: 325,996

[22] Filed: Oct. 19, 1994

[30] Foreign Application Priority Data

Oct. 20, 1993 [JP] Japan .................. 5-262820

[51] Int. Cl.$^6$ .............. G06F 7/38; G06F 15/31
[52] U.S. Cl. .............. 364/736; 364/724.1
[58] Field of Search .............. 364/736, 723, 364/724.1

[56] References Cited

U.S. PATENT DOCUMENTS

| | | | |
|---|---|---|---|
| 4,773,006 | 9/1988 | Kinoshita et al. | 364/736 |
| 4,811,267 | 3/1989 | Ando et al. | 364/736 |
| 4,837,723 | 6/1989 | Peacock | 364/724.01 |
| 4,951,238 | 8/1990 | Sasahara | 364/736 |
| 5,140,541 | 8/1992 | Sakata et al. | 364/724.19 |
| 5,179,531 | 1/1993 | Yamaki | 364/736 |
| 5,206,822 | 4/1993 | Taylor | 364/736 |
| 5,301,340 | 4/1994 | Cook | 364/736 |
| 5,307,300 | 4/1994 | Komoto et al. | 364/736 |

FOREIGN PATENT DOCUMENTS

| | | |
|---|---|---|
| 2 078 406 | 1/1982 | United Kingdom . |
| 2 250 110 | 5/1992 | United Kingdom . |

*Primary Examiner*—Tan V. Mai
*Attorney, Agent, or Firm*—Graham & James LLP

[57] ABSTRACT

A digital signal processing circuit, which is configured by a digital signal processor (i.e., DSP), includes at least a data memory, a coefficient memory, a calculation portion and an interpolation portion. The data memory stores a plurality of digital data which are sequentially supplied thereto, while the coefficient memory stores a plurality of coefficients in connection with the plurality of digital data. The calculation portion performs a specific calculation (e.g., multiplication), using the coefficient, on the digital data. When a new coefficient is given with respect to one of the coefficients designated, the interpolation portion performs interpolation processing on the designated coefficient so as to successively shift it to the new coefficient. The coefficient successively shifted is stored in the coefficient memory. Hence, the calculation portion performs the calculation, using the coefficient successively shifted, on the digital data.

20 Claims, 4 Drawing Sheets

DIGITAL SIGNAL PROCESSING CIRCUIT

BACKGROUND OF THE INVENTION

1. Field of the Invention

The present invention relates to a digital signal processing circuit which is suitable for use in digital audio devices and the like.

2. Prior Art

The known digital signal processor (i.e., DSP) is capable of performing a fade-in operation as well as a fade-out operation by performing multiplication, using predetermined coefficients, on digital signals inputted thereto; or the DSP is capable of combining those operations so as to perform cross-fade operations by which an sound effect (or acoustic effect) to be imparted to input signals is varied with respect to time.

FIG. 4 shows a simple configuration for the circuit which performs the cross-fade operations.

In the circuit shown in FIG. 4, an input signal applied to an input terminal is delivered to filters F1 and F2. Output signals of the filters F1 and F2 are respectively supplied to multipliers K1 and K2 in which they are multiplied by respective coefficients. Then, outputs of the multipliers K1 and K2 are added together by an adder ADD, so that a result of addition is outputted through an output terminal.

If the sound effect to be imparted to the input signal is not subjected to time-related variation, the multiplication coefficient used by the multiplier K1 is set at '1', while the multiplication coefficient used by the multiplier K2 is set at '0', so that only the output signal of the filter F1 is outputted.

On the other hand, when the sound effect is subjected to time-related variation, a filter coefficient of the filter F2 is renewed; and then the multiplication coefficient of the multiplier K2 is gradually increased up to '1' from '0' while the multiplication coefficient of the multiplier K1 is gradually decreased to '0' from '1'. Those operations will realize the cross-fade operations in the circuit shown in FIG. 4. According to the cross-fade operations, the sound effect to be imparted to the input signals is gradually shifted from a first sound effect, corresponding to a filtering characteristic of the filter F1, to a second sound effect corresponding to a filtering characteristic of the filter F2.

In order to perform arithmetic operations by using a great number of coefficients, the DSP performs convolution operations. Herein, a digital signal of one word is supplied to the DSP in each sampling period; hence, the DSP stores those digital signals in turn. Thus, the DSP performs the convolution operations on a certain amount of digital signals which are stored therein within a certain period of time.

As described above, the DSP inputs a new sample of data (i.e., new digital signal) by each sampling period; hence, the number of the samples of data which are sequentially stored in the DSP is increased in response to a progress in the number of sampling periods to be passed away. The DSP uses a certain number 'n' for the number of the samples of data, which are previously stored therein by the current sampling period in order to perform the convolution operations. If the sample of data, which is stored in the DSP at the current sampling period, is represented by a symbol "$X_m$", the DSP uses the samples of data, represented by "$X_m$" to "$X_{m-n+1}$", for the convolution operations using multiplication coefficients "$C_1$" to "$C_n$" respectively. The convolution operation is expressed by an equation as follows:

$$Y_m = \sum_{k=1}^{n} C_k X_{m-k+1} \quad (1)$$

In the above equation (1), "$Y_m$" represents a result of the convolution operations performed by the DSP.

The DSP described above is used in a variety of applications in the signal processing such as the filter processing and reverberation-imparting processing.

In order to change the sound effect to be imparted to the digital signals inputted while performing a variety of operational steps for imparting the sound effect, it is necessary to change the multiplication coefficients.

However, if the multiplication coefficients are changed suddenly, the output signals of the DSP are sharply changed, which will cause noises offensive to the ear. In order to avoid such a drawback, the DSP should perform a processing by which the multiplication coefficients are successively renewed. In the DSP conventionally known, such processing is performed by the external control portion such as the CPU.

According to the method of successively changing the multiplication coefficients by the CPU, the CPU should write the renewed coefficients into the DSP many times. Normally, the CPU is designed to perform a variety of processing for the device which contains the DSP. Therefore, it is not preferable for the CPU to take much time for the operation to write the renewed coefficients into the DSP.

In the case of the cross-fade operations, it is not necessary to set the filter coefficients so many times as compared to the multiplication coefficients. Hence, the number of the tasks which are loaded on the CPU may not be increased so much by undertaking the task for setting the coefficients. However, if the sound-effect characteristic is changed from one to another in order to obtain a variety of sound effects while gradually shifting the sound effect from one to another, the noises are easily produced and are incorporated in the output signals of the DSP. Therefore, an improvement of the DSP is demanded.

SUMMARY OF THE INVENTION

It is an object of the present invention to provide a digital signal processing circuit which is capable of changing the sound effect to be imparted to the input signals with respect to time without increasing the load to the control system externally provided.

A digital signal processing circuit according to the present invention, which is configured by the digital signal processor (i.e., DSP), comprises at least a data memory, a coefficient memory, a calculation portion and an interpolation portion. The data memory stores a plurality of digital data which are sequentially supplied thereto, while the coefficient memory stores a plurality of coefficients in connection with the plurality of digital data. The calculation portion performs a specific calculation (e.g., multiplication), using the coefficient, on the digital data. When a new coefficient is given with respect to one of the coefficients designated, the interpolation portion performs interpolation processing on the designated coefficient so as to successively shift it to the new coefficient. The coefficient successively shifted is stored in the coefficient memory. Hence, the calculation portion performs the calculation, using the coefficient successively shifted, on the digital data.

Since the interpolation processing for the coefficient is performed inside of the DSP, the DSP can perform the calculation, using the coefficient being successively shifted, on the digital data without increasing the load assigned to the control system (e.g., external CPU).

BRIEF DESCRIPTION OF THE DRAWINGS

Further objects and advantages of the present invention will be apparent from the following description, reference being had to the accompanying drawings wherein the preferred embodiments of the present invention are clearly shown.

In the drawings.

DESCRIPTION OF THE PREFERRED EMBODIMENTS

[A] First embodiment (1) Configuration of first embodiment

Figure 1:
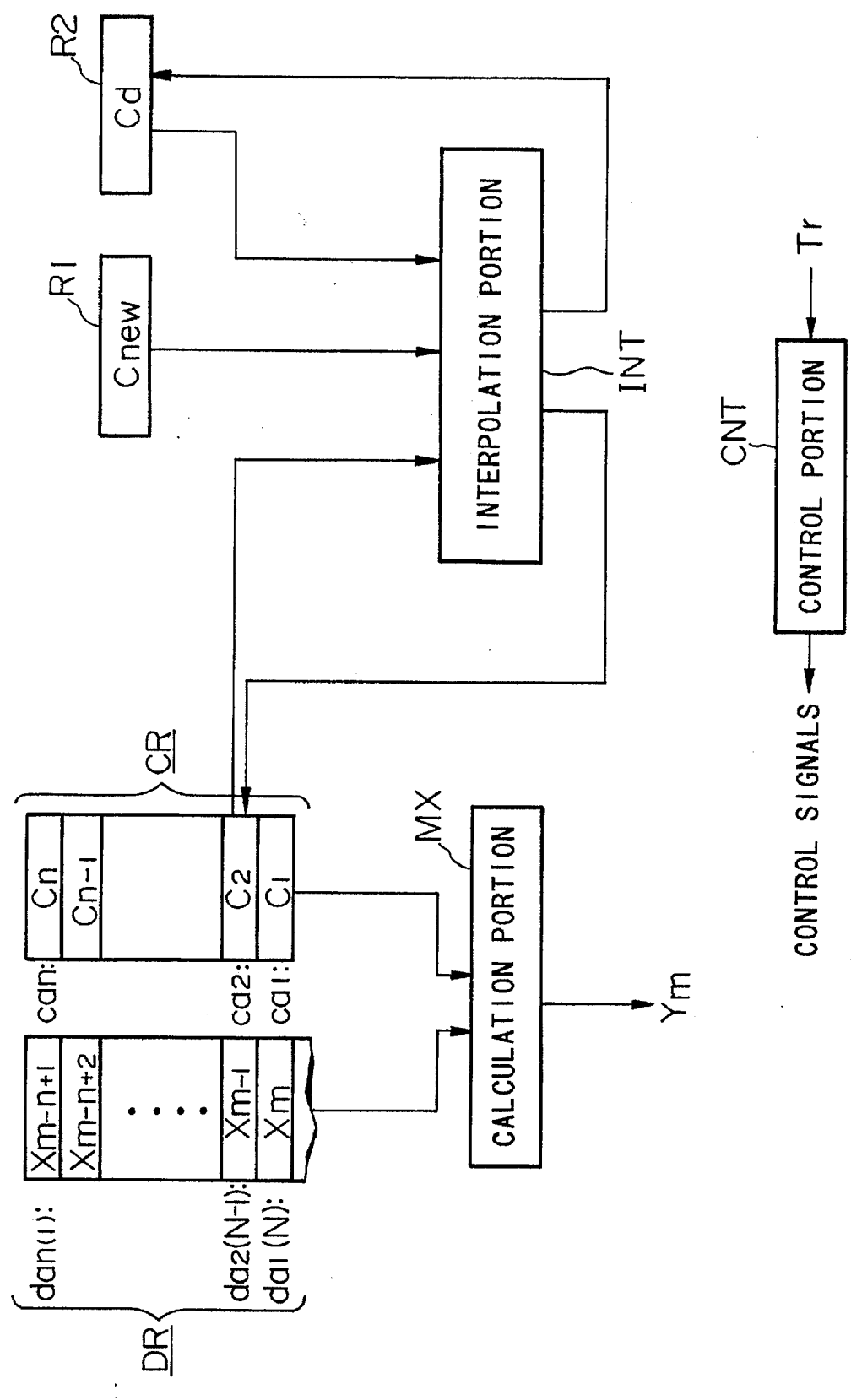
FIG. 1 is a block diagram showing a configuration for a digital signal processing circuit according to a first embodiment of the present invention.

FIG. 1 is a block diagram showing a configuration of a digital signal processor (i.e., DSP) which is a first embodiment of the present invention.

In FIG. 1, a symbol 'DR' denotes a RAM-type data memory (or RAM-type data buffer, where 'RAM' is an abbreviation for random-access memory) which stores digital signals inputted thereto from an external device or the like (not shown). Every time the sampling period is changed, an address counter (not shown) is activated to achieve an increment in its count number 'N' which designates an address of the data memory DR. Hence, the digital signal which is inputted to the DSP at the current sampling period is written into the data memory DR at the address which is currently designated by the count number N of the address counter.

The contents of the data memory DR, shown in FIG. 1, indicates the storage of the 'n' digital signals '$X_m$' to '$X_{m-n+1}$' which are previously supplied to the data memory DR until a certain sampling period. Symbols 'da1' to 'dan' denote addresses for storage areas at which the 'n' digital signals $X_m$ to $X_{m-n+1}$ are respectively and actually stored. A symbol 'CR' denotes a RAM-type coefficient memory having 'n' storage areas as similar to the data memory DR. Addresses 'ca1' to 'can' are respectively assigned to those storage areas which respectively store the multiplication coefficients $C_1$ to $C_n$.

The first embodiment is designed such that one of the multiplication coefficients $C_1$ to $C_n$, stored in the coefficient memory CR, is designated as a changeable coefficient which can be changed to a new coefficient $C_{new}$. This new coefficient $C_{new}$ is given from the external device and is written into a register R1. The operation to write the new coefficient $C_{new}$ into the register R1 is performed by an external CPU which is not shown.

A register R2 is provided to store data 'Cd' which is used to perform an interpolation processing by which the above-mentioned changeable coefficient is shifted close to the new coefficient $C_{new}$. For example, if the multiplication coefficient $C_2$ is designated as the changeable coefficient, the present embodiment performs a calculation as follows:

$$Cd = C_{new} - C_2 \quad (2)$$

Hence, the interpolation processing repeatedly uses the result of the above calculation so as to successively shift the changeable coefficient to the new coefficient $C_{new}$. The register R2 stores the result of the calculation expressed by the equation (2), i.e., the data Cd.

Next, a symbol 'MX' denotes a calculation unit which performs a variety of arithmetic operations such as adding, multiplying and the like. A symbol 'INT' denotes an interpolation portion which is configured by arithmetic-operation elements such as adders, multipliers and the like. Hence, the interpolation portion INT performs the calculations as defined by the aforementioned equation (2) and another equation for the interpolation operation which will be described later. A symbol 'CNT' denotes a control portion which executes micro programs, stored in storage devices (not shown), to produce control signals. Those control signals are respectively supplied to certain portions, in the DSP, so that the DSP performs the convolution operations and coefficient-interpolating operations. Incidentally, the aforementioned changeable coefficient can be designated by the micro program. The interpolation portion INT and the control portion CNT are configured by specific hardware circuits to be built in the DSP or are realized by software processing to be executed by the DSP. Hence, those portions can be driven independently of an external control system which is externally provided outside the DSP.

(2) Operations of first embodiment

Now, the arithmetic operations to be performed by the DSP, whose configuration is shown in FIG. 1, will be described below.

In each sampling period, the control portion CNT sequentially designates the addresses da1 to dan of the data memory DR; and the control portion CNT also designates one of the addresses ca1 to can of the coefficient memory CR; thus, the calculation portion MX performs the calculation using each of the digital signals $X_m$ to $X_{m-n+1}$ and the multiplication coefficient designated by the control portion CNT.

The following description is made with respect to the state where in the middle of the execution of the calculation, the external CPU writes the new coefficient $C_{new}$ for the coefficient $C_2$ into the register R1 so that a trigger signal Tr is supplied to the control portion CNT. In that state, the control portion CNT outputs the control signal, by which the interpolation portion INT is activated to perform interpolation operations, which will be described below.

At first, the calculation based on the aforementioned equation (2) is performed by using the coefficient $C_2$, stored in the address ca2 of the coefficient memory CR, and the new coefficient $C_{new}$, which is written in the register R1. Then, the result of calculation, i.e., data Cd, is stored in the register R2.

Thereafter, the interpolation portion INT performs an interpolation operation which is expressed by an equation as follows:

$$CC_2 = C_2 + Cd \cdot 1/N \quad (3)$$

According to the above equation (3), an interpolated coefficient '$CC_2$' is obtained. Herein, a number 'N' indicates a number of steps in the interpolation processing to be executed; in other words, a number of times by which the interpolation operations are performed. This number N is set to the interpolation portion INT in advance.

Then, the coefficient $C_2$, which is originally stored at the address ca2 of the coefficient memory CR, is replaced by the interpolated coefficient $CC_2$, which is then stored at the address ca2 of the coefficient memory CR.

In the next sampling period, the calculation portion MX performs the calculation using the interpolated coefficient $CC_2$.

The above-mentioned replacement of the coefficient, stored as the certain address of the coefficient memory CR, is performed once in each sampling period of the calculation performed by the calculation portion MX; or it is performed once in the predetermined number of sampling periods. The interpolation portion INT repeatedly performs the interpolation operation, based on the equation (3), 'N' times; thus, the coefficient, stored at the address ca2 of the coefficient memory CR, is renewed 'N' times.

By performing the interpolation operations in the interpolation processing, the coefficient $C_2$ will be finally shifted to the new coefficient $C_{new}$. Actually, however, the division term or the like, provided in the equation (3), may produce a possibility that an operation error occurs. In order to cope with an occurrence of the operation error, when the interpolation operations are performed 'N' times, the control portion CNT performs a writing operation to write the new coefficient $C_{new}$ at the address ca2 of the coefficient memory CR. Thus, the stored contents of the address ca2 of the coefficient memory CR perfectly coincides with the new coefficient $C_{new}$.

Incidentally, the external device or the like is capable of making a decision as to whether or not the new coefficient $C_{new}$ is written into the coefficient memory CR at the completion of the interpolation processing. For example, if it is clearly said that no remainder occurs because the data Cd is clearly divided by the number 'N', which is the denominator of the division term in the aforementioned equation (3), the external device makes a decision by which the new coefficient $C_{new}$ is not written into the coefficient memory CR.

Next, the description will be made with respect to the case where the operations to write the interpolated coefficients into the coefficient memory CR are repeated but the number of repeating those operations does not reach the number 'N' (in other words, the case where the interpolation processing is now progressing but is not completed). In that case, a new coefficient $C_{new1}$, which corresponds to the coefficient $C_2$, is written into the register R1, so that the trigger signal Tr is supplied to the control portion CNT.

In the above-mentioned case, the control portion CNT sends the control signal to the interpolation portion INT, so that the interpolation portion INT performs the calculation based on the aforementioned equation (2) so as to produce data Cd1, which corresponds to the aforementioned data Cd. This data Cd1 is stored in the register R2.

The above-mentioned data Cd indicates a number which corresponds to a difference between the new coefficient $C_{new1}$ and the interpolated coefficient of the coefficient $C_2$. Then, the DSP, shown in FIG. 1, proceeds with a new interpolation operation which is similar to the foregoing interpolation operation.

In the above-mentioned case, the interpolation processing is interrupted, and then the DSP restarts the interpolation processing with starting the new interpolation operation. In that case, there is a small interruption time in which the trigger signal Tr is supplied to the control portion CNT after the new coefficient $C_{new1}$ is written into the register R1. Hence, there is a possibility that the interpolation processing may be ended in the interruption time.

Although the operation to write the new coefficient $C_{new}$ into the coefficient memory CR is scheduled to be performed when the interpolation processing is completed, if the aforementioned possibility occurs, another coefficient $C_{new1}$ should be suddenly written at the address ca2 of the coefficient memory GR. This is not a desirable situation. In that situation, there is a possibility that the value of the coefficient, stored at the address ca2 of the coefficient memory CR, is remarkably changed if there is a relatively big difference between the coefficient $C_{new1}$, which should be unintentionally written at the address ca2, and the coefficient $C_{new}$ which is originally intended to be written at the address ca2 when the interpolation processing is completed.

In order to cope with the above-mentioned situation, the digital signal processing circuit is controlled as follows:

When the new interpolation operation is started in the middle of the interpolation processing, the operation to write the new coefficient $C_{new}$ into the coefficient memory CR is prohibited if it is Just before a timing at which the coefficient $C_{new1}$ is written into the register R1; hence, after the new interpolation operation is started, the operation to write the new coefficient $C_{new}$ into the coefficient memory CR is activated.

As described heretofore, upon the receipt of the new coefficient $C_{new}$ from the external CPU, the coefficient used for the calculation performed by the calculation portion MX is successively shifted to the new coefficient by the interpolation processing which is executed within the DSP. Hence, the present embodiment is advantageous in that without creating a supplemental load to the external CPU, the sound effect, corresponding to the result of the calculation performed by the calculation portion MX, can be varied with respect to time.

(c) Modified example

Figure 2:
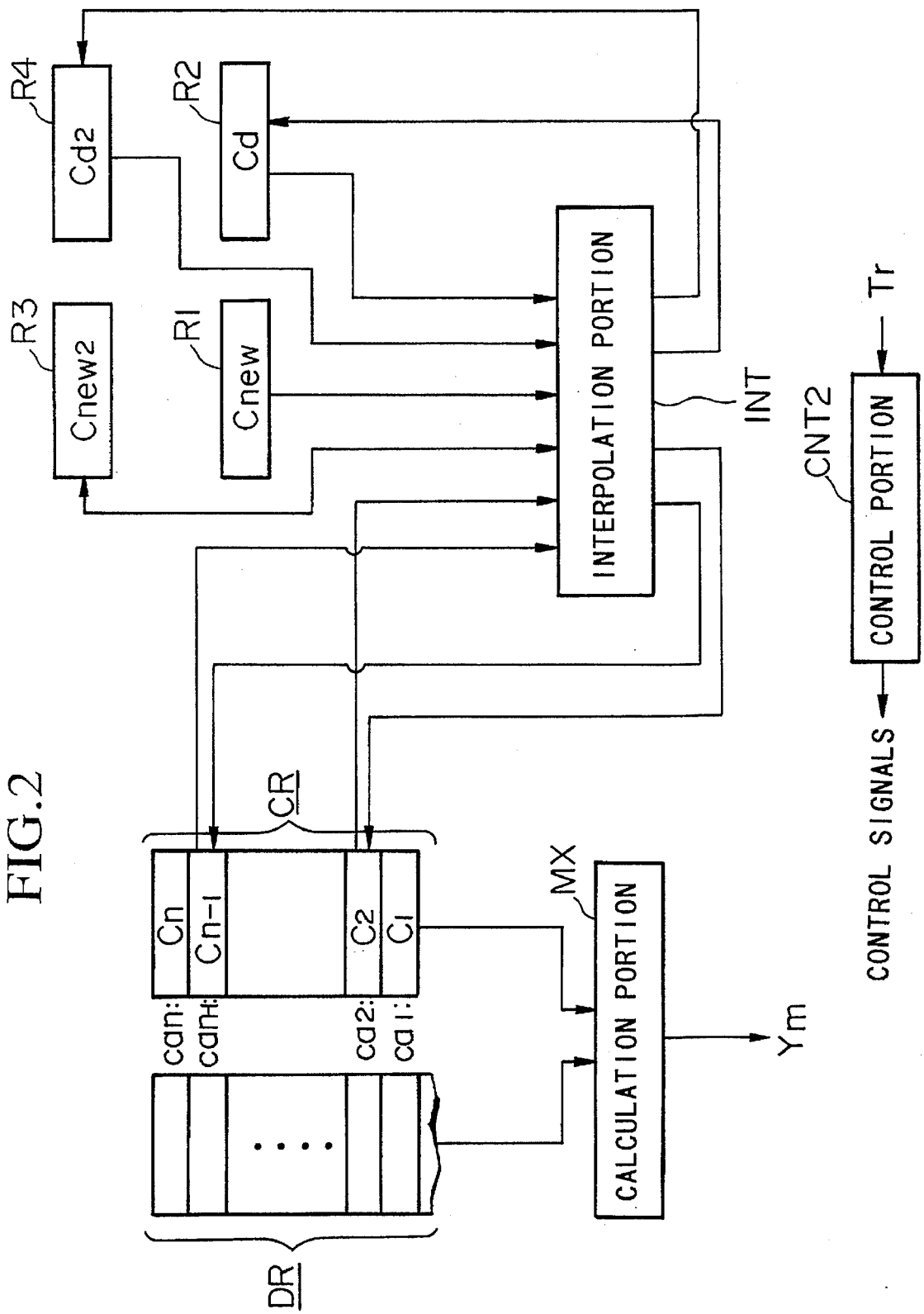
FIG. 2 is a block diagram showing a configuration for an modified example of the digital signal processing circuit.

FIG. 2 is a block diagram showing a detailed configuration for a DSP which is a modified example of the first embodiment. In FIG. 2, the parts corresponding to those shown in FIG. 1 will be designated by the same, numerals; hence, the description thereof will be omitted.

In FIG. 2, a register R3, which is similar to the foregoing register R1, is provided to store a new coefficient $C_{new2}$ in connection with the changeable coefficient (e.g., $C_2$) which is designated from among the coefficients $C_1$ to $C_n$ stored in the coefficient memory CR. A register R4, which is similar to the foregoing register R2, is provided to store difference data Cd2 representative of a difference between the designated changeable coefficient and the new coefficient $C_{new2}$ stored in the register R3. The provision of those registers R3 and R4 enables the DSP, shown in FIG. 2, to change the two coefficients at once.

As similar to the control portion CNT, shown in FIG. 1, a control portion CNT2 shown in FIG. 2 is provided to control the interpolation portion INT in association with the values stored in the registers R1 and R2. Further, when another changeable coefficient (e.g., $C_{n-1}$, see FIG. 2) is designated, the control portion CNT2 controls the interpolation portion INT in association with the values stored in the registers R3 and R4.

Next, operations of the modified example shown in FIG. 2 will be described in detail.

Now, the external CPU outputs the new coefficients $C_{new}$ and $C_{new2}$ in connection with the coefficients $C_2$ and $C_{n-1}$ respectively; hence, those new coefficients $C_{new}$ and $C_{new2}$ are respectively written into the registers R1 and R3. At this time, a trigger signal Tr is supplied to the control portion CNT2.

Responsive to the trigger signal Tr, the control portion CNT2 outputs a control signal to the interpolation portion INT so that the interpolation portion INT calculates the data Cd and Cd2, which are respectively stored in the registers R2 and R4.

The interpolation portion INT performs the interpolation operations, as expressed by the foregoing equation (3), by using the coefficients $C_2$ and $C_{n-1}$ as well as the data Cd and Cd2. Thus, the interpolation portion INT produces interpolated coefficients $CC_2$ and $CC_{n-1}$, which are respectively written into the addresses ca2 and can-1 of the coefficient memory CR. In other words, the coefficients $C_2$ and $C_{n-1}$ are respectively renewed by the interpolated coefficients $CC_2$ and $CC_{n-1}$.

The above-mentioned operations to renew the coefficients by the interpolated coefficients are performed in a certain sampling period. In the next sampling period, the calculation portion MX performs arithmetic operations using the renewed coefficients.

The interpolation operation is performed once in one sampling period with respect to one coefficient; or the interpolation operation is performed once in a predetermined number of sampling periods with respect to one coefficient. Finally, the interpolation portion INT performs the interpolation operations 'N' times with respect to one coefficient. Each time the interpolation operation is performed, the coefficient is renewed by the interpolated coefficient. Thus, the coefficients $C_2$ and $C_{n-1}$, stored at the addresses ca2 and can-1 of the coefficient memory CR, are successively renewed in response to a progress of the interpolation processing to be performed by the interpolation portion INT.

When the number of times by which the interpolation operations are performed with respect to one coefficient reaches 'N' in a certain sampling period, the modified example, shown in FIG. 2, works as similar to the foregoing first embodiment shown in FIG. 1. In short, if the operation to write the new coefficient into the coefficient memory CR is scheduled to be performed when the interpolation processing is completed, the new coefficients $C_{new}$ and $C_{new2}$ are respectively written at the addresses ca2 and can-1 of the coefficient memory CR in the next sampling period.

In short, the modified example is characterized by providing two registers R1 and R3 for the storage of the new coefficients as well as providing two registers R2 and R4 for the storage of the data used for the interpolation operations. The provision of those registers enables the DSP to simultaneously renew two coefficients by the interpolated coefficients. In other words, it is possible to gradually shift those coefficients to the new coefficients in a lapse of time.

Incidentally, it is possible to further modify the first embodiment to provide multiple pairs of registers so that the interpolation operations can be simultaneously performed on the multiple coefficients. In that case, it is possible to independently control each of the interpolation operations. For instance, each of the timings to perform the interpolation operations can be determined independently; or the same timing can be determined for the interpolation operations, wherein the interpolation operations are performed by a time-sharing system.

Furthermore, the first embodiment can be modified such that a large-capacity memory is used for the coefficient memory CR with canceling the provision of the registers for the interpolation operations. In that case, the large-capacity memory stores the new coefficient and data, used for the interpolation operation, as well as the coefficients. Instead of the aforementioned equation (2), which is used by the first embodiment in order to calculate the data Cd, it is possible to use an equation (4) as follows:

$$Cd=(C_{new}-C_2)\cdot\alpha \quad (4)$$

If a number "$\alpha$" is set equal to "$2^M$" (where a number 'M' is normally set as a negative number), the calculation expressed by the equation (4) can be realized by the bit-shift operations; hence, a circuit configuration for the interpolation portion INT can be simplified.

[B] Second embodiment (1) Configuration of second embodiment

Figure 3:
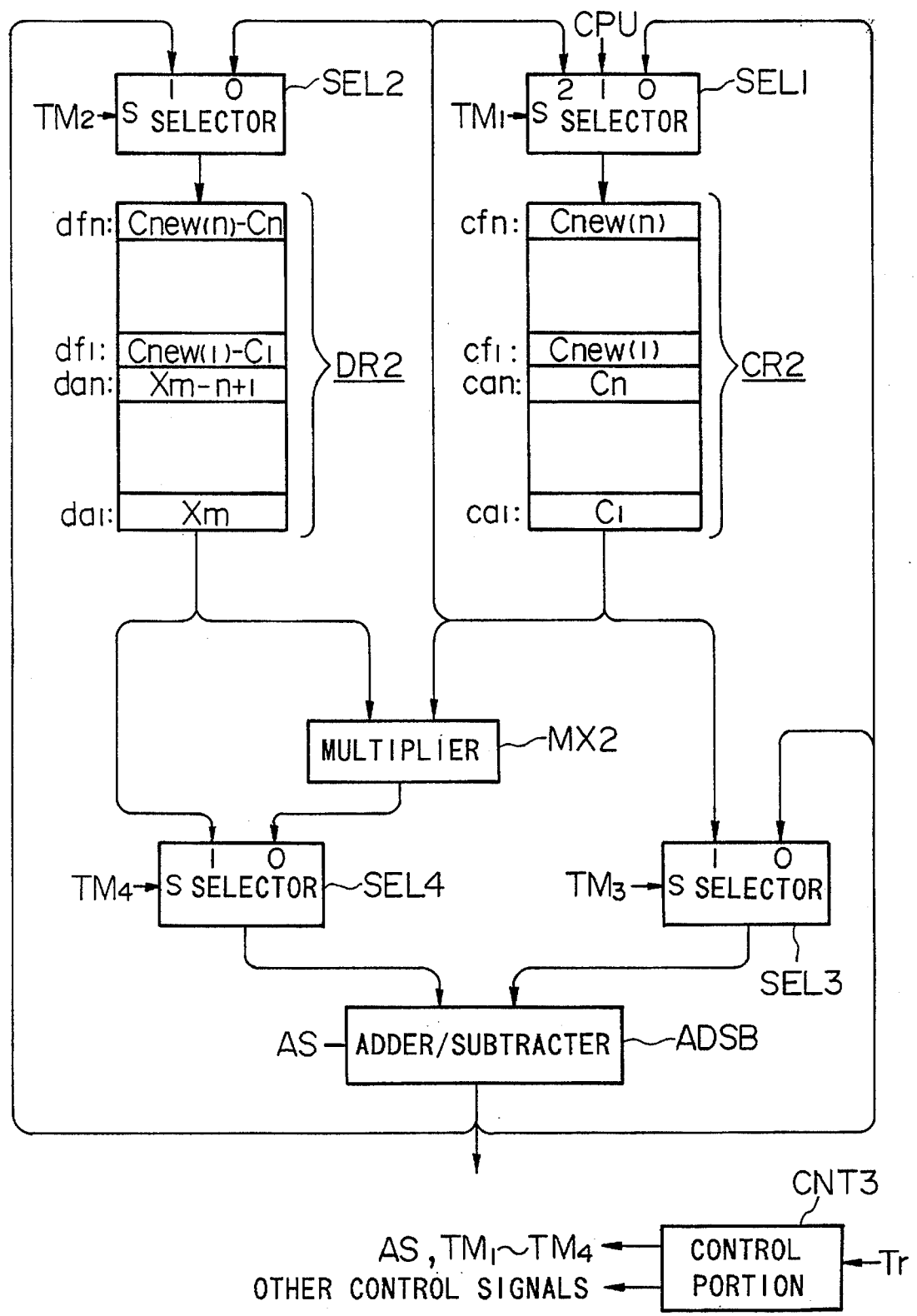
FIG. 3 is a block diagram showing a configuration for a digital signal processing circuit according to a second embodiment of the present invention.
Figure 4:
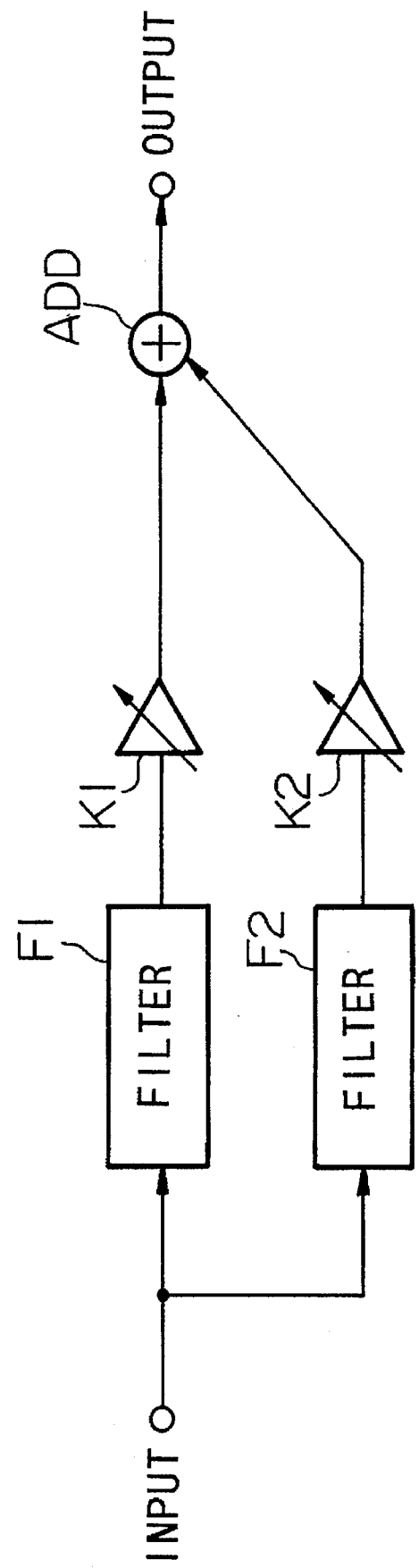
FIG. 4 is a block diagram showing an example of configuration for the digital signal processing circuit conventionally known.

FIG. 3 is a block diagram showing a detailed configuration for a DSP which is a second embodiment of the present invention. This DSP is specifically used for the convolution operations and is manufactured by the LSI technology. The second embodiment is characterized by that all of the coefficients for the convolution operations can be changed at once; and the second embodiment is also characterized by providing a selection for modes, i.e., coefficient-interpolation mode and normal mode, by which a decision is made as to whether or not the interpolation operation is performed with respect to each coefficient.

In FIG. 3, a symbol 'CR2' denotes a RAM-type coefficient memory having multiple storage areas, the number of which is equal to '2n' (where 'n' is an integral number). The overall area of the coefficient memory CR2 is functionally divided into two portions, wherein a first portion contains the 'n' storage areas to which the aforementioned addresses ca1 to can are respectively assigned; and a second portion contains the 'n' storage areas to which addresses cf1 to cfn are respectively assigned.

A symbol 'DR2' denotes a RAM-type data memory having multiple storage areas, the number of which is equal to '2n'. Like the coefficient memory CR2, the overall area of the data memory DR2 is divided into two portions, wherein a first portion contains the 'n' storage areas to which the addresses da1 to dan are respectively assigned; and a second portion contains the 'n' storage areas to which addresses df1 to dfn are respectively assigned.

When the coefficient-interpolation mode is selected, the first portion of the data memory DR2, corresponding to the addresses da1 to dan, is used to store the digital signals, wherein the DSP inputs the digital signal of one word, given from the external device, by each sampling period. In order to perform the convolution operations, the first portion of the data memory DR2 stores a digital signal, which is newly written therein at a current sampling period, and other digital signals, the number of which is equal to 'n-1'. Hence, the total 'n' digital signals, containing the digital signal currently written, are normally stored in the first portion of the data memory DR2; and those digital signals are supplied to a multiplier MX2.

In addition, the first portion of the coefficient memory CR2, corresponding to the addresses ca1 to can, is used to store the multiplication coefficients $C_1$ to $C_n$ for the convolution operations.

On the other hand, the second portion of the coefficient memory CR2, corresponding to the addresses cf1 to cfn, is used to store new coefficients $C_{new}(1)$ to $C_{new}(n)$ which respectively correspond to the multiplication coefficients $C_1$ to $C_n$. Each of the storage areas in the second portion of the data memory DR2, corresponding to the addresses df1 to dfn, is used to store a difference between the multiplication coefficient and new coefficient, i.e., "$C_{new}(1)-_1$" to "$C_{new}(n)-C_n$".

In contrast, when the normal mode is selected so that the interpolation operations for the coefficients are canceled, the second portion of the data memory DR2 is used as an extended storage area in which the digital signals, inputted thereto from the external device, are to be stored; and the second portion of the coefficient memory CR2 is used as an extended storage area in which the multiplication coefficients for the convolution operations are to be stored. Thus, it is possible to set '2n' multiplication coefficients $C_1$ to $C_{2n}$; in other words, it is possible to increase the number of the stages of the convolution operations up to '2n'.

Next, a symbol 'ADSB' denotes an adder/subtracter which performs either an addition or a subtraction in response to the control signal supplied thereto from the external device.

A symbol 'SEL1' denotes a selector having three input terminals, designated by numerals '0', '1' and '2', as well as a select terminal 'S' which receives select information. On the basis of the select information, the selector SEL1 selectively outputs one of three input signals respectively supplied to the three input terminals. For example, the input terminal '0' is selected when the number of the select information is equal to '0'; and the input terminal '1' is selected when the number of the select information is equal to '1'.

Symbols 'SEL2', 'SEL3' and 'SEL4' denote selectors, each having two input terminals '0' and '1' as well as one select terminal 'S'. One of the two input terminals is designated by the select information supplied to the select terminal 'S', so that an input signal thereof is selectively outputted.

Each of the outputs of the selector SEL1 is stored at a designated address of the coefficient memory CR2; and each of the outputs of the selector SEL2 is stored at a designated address of the data memory DR2. Outputs of the selectors SEL3 and SEL4 are supplied to the adder/subtracter ADSB.

Next, a symbol 'CNT3' denotes a control portion which produces control signals TM1 to TM4 and AS as well as other control signals which are supplied to the corresponding parts of the DSP so as to start the convolution operations or interpolation operations. Each of the control signals TM1 to TM4 is supplied to each of the selectors SEL1 to SEL4 as the select information; and the control signal AS is supplied to the adder/subtracter ADSB so as to specify the calculation to be performed by the adder/subtracter ADSB.

(2) Operations of second embodiment

Now, the operations of the second embodiment will be described in detail with respect to each of the situations ① to ⑤.

① First situation where the coefficient-interpolation mode is selected but the interpolation operation is not performed.

When the coefficient-interpolation mode is selected for the DSP according to the second embodiment, the interpolation operation for the coefficient is performed in a first-half time of one sampling period; and then, the convolution operation is performed in a second-half time of the one sampling period.

However, in order to perform the interpolation processing gradually, one cycle of interpolation processing is not performed by each sampling period but by multiple sampling periods. In that case, even if the coefficient-interpolation mode is selected, there exist one or more sampling periods in which the interpolation processing is not performed. In the sampling period in which the interpolation processing is not performed, an overall time of that sampling period can be used for the convolution operations. In addition, the duration in which the new coefficients $C_{new}(1)$ to $C_{new}(n)$ are written into the second portion of the coefficient memory CR2, corresponding to the addresses cf1 to cfn, does not relate to the interpolation operation for the coefficient.

In the time in which the convolution operations are performed, the control portion CNT3 produces the control signals TM3 and TM4, both of which is set at '0'. Thus, the input terminal '0' is selected for both of the selectors SEL3 and SEL4. In addition, the control signal AS, produced by the control portion CNT3, designates the addition as the calculation to be performed by the adder/subtracter ADSB.

Thus, the convolution operations are performed by a circuit portion configured by the selectors SEL3, SEL4, the multiplier MX2 and the adder/subtracter ADSB.

In the duration in which the interpolation operation for the coefficient is not actually performed, the control portion CNT3 produces the control signal TM1 which is set at '1'. Thus, the selector SEL1 selects the input terminal '1' in order to prepare for the entry of the new coefficients $C_{new}(1)$ to $C_{new}(n)$.

② Second situation where the new coefficient is written into the coefficient memory CR2.

In the second situation, the new coefficients $C_{new}(1)$ to $C_{new}(n)$, given from the external CPU (not shown), are supplied to the coefficient memory CR2 through the selector SEL1, whose input terminal '1' is selected, and are respectively written at the addresses cf1 to cfn; and the trigger signal Tr is supplied to the control portion CNT3.

Now, at a first-half time of the sampling period in which the interpolation processing for the coefficient should be performed, the control portion CNT3 produces the control signal TM2 which is set at '0'; hence, the input terminal '0' is selected for the selector SEL2. Thus, the coefficients $C_1$ to $C_n$, which are respectively written at the addresses ca1 to can of the coefficient memory CR2, are copied respectively to the addresses df1 to dfn of the data memory DR2 through the selector SEL2.

③ Third situation where a difference between the new coefficient and coefficient is calculated and is written in the second portion of the data memory DR2.

In the third situation, the control portion CNT3 produces the control signals TM2, TM3 and TM4 which are respectively set at '1'; hence, the input terminal '1' is selected for all of the selectors SEL2, SEL3 and SEL4. In addition, the control signal AS, produced by the control portion CNT3, designates a subtraction as the calculation to be performed by the adder/subtracter ADSB. Therefore, a circuit portion configured by the selectors SEL3, SEL4 and the adder/subtracter ADSB work as a calculation circuit which sequentially calculates differences between the new coefficients $C_{new}(1)$–$C_{new}(n)$ and the coefficients $C_1$–$C_n$. Thus, the differences, expressed by "$C_{new}(1)$–$C_1$" to "$C_{new}(n)$–$C_n$", are sequentially calculated and are respectively written at the addresses df1 to dfn of the date memory DR2.

Then, at a second-half time of the sampling period, the input terminal '0' is selected for both of the selectors SEL3 and SEL4 in order to start the convolution operations; and the addition is designated for the adder/subtracter ADSB. Thus, the convolution operations are performed by using the coefficients $C_1$ to $C_n$.

④ Fourth situation where first interpolation operation is performed on the coefficients so that the interpolated coefficients are written into the coefficient memory CR2.

Now, when the sampling period, in which the interpolation processing for the coefficient should be performed, is started, the input terminal '0' is selected for the selector SEL1, while the input terminal '1' is selected for both of the selectors SEL3 and SEL4; and the addition is designated for the adder/subtracter ADSB.

According to the processing which is performed in the aforementioned situation ③, the differences, expressed by "$C_{new}(1)$–$C_1$" to "$C_{new}(n)$–$C_n$", are respectively stored at the addresses df1 to dfn in the second portion of the data memory DR2. Each of those differences is subjected to bit-shift-down operation by a shift-operation portion (not shown), wherein the number of bits to be shifted down is set at 'j' (where 'j' is an integral number). The above-mentioned bit-shift-down operation can be expressed by an equation as follows:

$$Cdx = (C_{new}(x) - C_x)/2j \qquad (5)$$

where 'x' designates a variable which is varied in a range between '1' and 'n'. This bit-shift-down operation is performed with respect to each of the differences so as to obtain data 'Cdx'. Then, the data Cdx is supplied to the selector SEL4 with respect to each of the differences.

Incidentally, a number as represented by '2j' in the equation (5) corresponds to the number of times by which the interpolation operations are performed; and the number j is determined in advance.

The coefficient $C_x$, i.e., $C_1$–$C_n$ which are stored in the first portion of the coefficient memory CR2, is supplied to the selector SEL8. The adder/subtracter ADSB, for which the addition is now selected, performs an addition on the data Cdx and the coefficient $C_x$ in accordance with an equation as follows:

$$CC_x = C_x + Cdx \qquad (6)$$

Then, the result of addition, i.e., '$CC_x$', is supplied to the coefficient memory CR2 through the selector SEL1, wherein it is written at the certain address within the addresses ca1-can.

By repeating the above-mentioned operations, the coefficients $C_1$ to $C_n$ are respectively replaced by the interpolated coefficients $CC_1$ to $CC_n$.

In the second-half time of the current sampling period, the convolution operations are performed. Before performing the convolution operations, the input terminal '0' is selected for both of the selectors SEL3 and SEL4. Thus, the convolution operations, using the coefficients $CC_1$ to $CC_n$, are performed with respect to the digital signals which are sequentially outputted from the data memory DR2. Therefore, the results of the convolution operations are outputted from the DSP.

⑤ Fifth situation which emerges until the interpolation processing is completed.

The processing, which is performed in the aforementioned fourth situation ④, is repeated multiple times, the number of which is represented by '2j-1'. Each time this processing is performed, each of the coefficients $C_1$ to $C_n$ is increased by 'Cdx' in accordance with the aforementioned equation (6); in result, those coefficients are respectively shifted to the new coefficients $C_{new}(1)$ to $C_{new}(n)$.

In that case, the second embodiment described heretofore is controlled as similar to the foregoing first embodiment. That is, in order to perfectly coincide each of the shifted coefficient with each of the new coefficients $C_{new}(1)$ to $C_{new}(n)$, the operations to write the new coefficients $C_{new}(1)$ to $C_{new}(n)$ into the coefficient memory CR2 are performed after the completion of the interpolation processing.

Before starting the above-mentioned writing operations, in the first-half time of the next sampling period, the input terminal '2' is selected for the selector SEL1. Then, the new coefficients $C_{new}(1)$ to $C_{new}(n)$, which are written in the second portion of the coefficient memory CR2, are copied to the first portion of the coefficient memory CR2 through the selector SEL1.

In the second embodiment, however, the above writing operations can be arbitrarily canceled as similar to the first embodiment.

When changing the coefficients stored in the first portion of the coefficient memory CR2 again in the middle of the interpolation processing, the second embodiment is controlled as similar to the first embodiment. In that case, other new coefficients $CC_{new}(1)$ to $CC_{new}(n)$ are respectively written at the addresses cf1 to cfn of the coefficient memory CR2; and then, the trigger signal Tr, which activates the interpolation operations to be performed, is supplied to the control portion CNT3 again.

As described heretofore, the second embodiment is characterized by that by merely writing the new coefficients $C_{new}(1)$ to $C_{new}(n)$ into the coefficient memory CR2 by the external CPU, all of the coefficients, used for the convolution operations, are successively shifted close to the new coefficients by the interpolation processing which is performed inside of the DSP. Therefore, the second embodiment is advantageous in that the sound effect can be altered with respect to time without loading any supplemental tasks to the external CPU.

[C] Modification (1) The second embodiment does not require the multiplier in the calculation of the interpolated coefficients because that calculation is made by merely performing the bit-shift operation using the difference between the coefficient and new coefficient; hence, the aforementioned equation (5) is employed.

However, this equation can be replaced by another equation as follows:

$$Cdx = (C_{new}(x) - C_x) \times (1/K) \qquad (7)$$

where 'K' is an integral number. When using the equation (7), the multiplier MX2 is used to calculate the interpolated coefficient. In that case, it is possible to set the number of steps in the interpolation processing at 'K', wherein this number 'K' can be arbitrarily set, regardless of the number '$2^j$'. Thus, by employing the equation (7), the freedom of degree can be increased in the interpolation processing.

(2) The second embodiment provides the normal mode in which the interpolation operations for the coefficients are not performed but the convolution operations, having the '2n' stages using the multiplication coefficients $C_1$ to $C_{2n}$, are performed. Instead, it is possible to independently use each of the second portions of the coefficient memory CR2 and the data memory DR2 for the specific convolution operations. In that case, the 'n' stages of convolution operations can be performed using each of the second portions.

(3) It is possible to re-design the second embodiment such that the interpolation portion INT, which is used by the first embodiment (see FIG. 1), is further incorporated in the second embodiment shown in FIG. 3. In that case, the convolution operations and interpolation operations can be performed in parallel; hence, the selectors can be canceled.

(4) In the embodiments described before, the difference between the coefficient and new coefficient or its corresponding value is calculated in advance before actually starting the interpolation operations; hence, the difference calculated is stored in some storage area which is different from the storage area to store the new coefficient. Therefore, it is not necessary to refer to the new coefficient during the interpolation processing which is now in progress; in other words, it is possible to easily start the new interpolation operation for another new coefficient in the middle of the interpolation processing. Thus, the present invention is advantageous in that a variety of sound effects can be realized.

In both of the embodiments, the interpolation operations are performed 'N' times; but the same amount of value to be increased or decreased is set for each of the interpolation operations; in other words, the interpolation processing is performed linearly. However, the interpolation processing employed by the present invention is not limited to such linear processing. For example, it is possible to use an additional equation by which the amount of value for the interpolation can be differed with respect to each interpolation operation.

Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A digital signal processing device comprising:
   a first memory for storing operational coefficients and selectively storing new coefficients supplied thereto from an external device;
   a second memory for storing digital data;
   operation means for selectively performing:
      an interpolation operation by which the values of said operational coefficients stored in said first memory are progressively changed so as to approach the values of said new coefficients, and
      an arithmetic operation on said digital data stored in said second memory utilizing said operational coefficients stored in said first memory; and
   control means for generating at least one control signal to cause said operation means to perform one of said interpolation operation and said arithmetic operation.

2. A digital signal processing device according to claim 1, wherein said arithmetic operation includes a multiplication operation by which said digital data is multiplied by said operational coefficient stored in said first memory means.

3. A digital signal processing device according to claim 1, wherein said arithmetic operation includes a convolution operation comprising addition and multiplication.

4. A digital signal processing device according to claim 1, wherein said first memory and said second memory comprise at least one random access memory.

5. A digital signal processing device according to claim 1 further comprising control means for controlling said operation means such that said interpolation operation is performed once during each of a series of periodic sampling periods.

6. A digital signal processing device according to claim 1 further comprising control means for controlling said operation means such that said interpolation operation is performed only once during a plurality of periodic sampling periods.

7. The digital signal processing device of claim 1, wherein said operations selectively performed by said operation means further include calculating difference data representing a difference between the values of said operational coefficients stored in said first memory and the values of said new coefficients.

8. The digital signal processing device of claim 7, wherein said operation means includes means for utilizing said difference data to perform said interpolation operation.

9. The digital signal processing device of claim 7 further comprising means for selectively storing said difference data in a portion of said second memory.

10. The digital signal processing device of claim 1, wherein said control means further comprises means for causing said operation means to perform said interpolation operation during a first portion of a periodic sampling period and said arithmetic operation during a second portion of said periodic sampling period.

11. The digital signal processing device of claim 1 further comprising rewriting means for replacing the values of said operational coefficients stored in said first memory means with the values of said new coefficients following completion of said interpolation operation.

12. The digital signal processing device of claim 1 further comprising trigger generating means for generating a trigger when said external device supplies said new coefficients to said first memory means, said trigger being received by said control means.

13. A digital signal processing device comprising:
   a first memory for storing operational coefficients and selectively storing a new coefficient supplied thereto from an external device;
   a second memory for storing digital data;
   operation means for selectively performing:
      an interpolation operation by which the value of one of said operational coefficients stored in said first memory is progressively changed so as to approach the value of said new coefficient, and
      an arithmetic operation on said digital data stored in said second memory utilizing said operational coefficients stored in said first memory; and
   control means for generating at least one control signal to cause said operation means to perform one of said interpolation operation and said arithmetic operation.

14. A digital signal processing device according to claim 13 further comprising control means for controlling said operation means such that said interpolation operation is performed only once during a plurality of periodic sampling periods.

15. The digital signal processing device of claim 13 further comprising trigger generating means for generating a trigger when said external device supplies said new coefficient to said first memory means, said trigger being received by said control means.

16. The digital signal processing device of claim 13, wherein said operations selectively performed by said operation means further include calculating difference data representing a difference between the value of said one of said operational coefficients stored in said first memory and the value of said new coefficient.

17. The digital signal processing device of claim 16, wherein said operation means includes means for utilizing said difference data to perform said interpolation operation.

18. The digital signal processing device of claim 16 further comprising means for selectively storing said difference data in a portion of said second memory.

19. The digital signal processing device of claim 13, wherein said control means further comprises means for causing said operation means to perform said interpolation operation during a first portion of a periodic sampling period and said arithmetic operation during a second portion of said periodic sampling period.

20. The digital signal processing device of claim 13 further comprising rewriting means for replacing the value of said one of said operational coefficient stored in said first memory means with the value of said new coefficient following completion of said interpolation operation.

* * * * *